United States Patent [19]
Ohuchi

[11] Patent Number: 5,503,131
[45] Date of Patent: Apr. 2, 1996

[54] STEPPING MOTOR DRIVING APPARATUS AND EXHAUST GAS RECIRCULATION CONTROL SYSTEM USING THE SAME

[75] Inventor: Hirofumi Ohuchi, Himeji, Japan

[73] Assignee: Mitsubishi Denki Kabushiki Kaisha, Tokyo, Japan

[21] Appl. No.: 305,711

[22] Filed: Sep. 14, 1994

[30] Foreign Application Priority Data

Sep. 20, 1993 [JP] Japan .................. 5-233454

[51] Int. Cl.$^6$ .............. F02M 25/07; H02P 8/00
[52] U.S. Cl. .......................... 123/571; 318/696
[58] Field of Search ............ 123/339.26, 361, 123/399, 571, 585; 251/129.11; 318/685, 696; 273/185 A

[56] References Cited

U.S. PATENT DOCUMENTS

| | | | |
|---|---|---|---|
| 4,674,464 | 6/1987 | Akagi | 123/571 |
| 4,690,120 | 9/1987 | Egle | 123/571 |
| 4,823,749 | 4/1989 | Eisenmann et al. | 123/339.26 |
| 4,924,840 | 5/1990 | Wade | 123/571 |
| 5,061,888 | 10/1991 | Hiraoka | 318/696 |
| 5,105,140 | 4/1992 | Matthews et al. | 318/696 |
| 5,175,482 | 12/1992 | DeGuchi | 318/696 |
| 5,340,108 | 8/1994 | Gerpheide et al. | 273/185 A |
| 5,396,869 | 3/1995 | Suzuki et al. | 123/399 |

FOREIGN PATENT DOCUMENTS

| | | |
|---|---|---|
| 93166 | 5/1985 | Japan . |
| 0095763 | 4/1990 | Japan . |

Primary Examiner—Willis R. Wolfe
Attorney, Agent, or Firm—Sughrue, Mion, Zinn, Macpeak and Seas

[57] ABSTRACT

An exhaust gas recirculation control system includes a stepping motor driven valve for controlling the flow rate of exhaust gas through a recirculation pipe of an internal combustion engine, and arithmetic circuitry for calculating the exhaust gas recirculation flow rate in dependence on the operating state of the engine. A two-phase excitation driving scheme and a one/two-phase excitation driving scheme are exchangeably adopted for driving the stepping motor to control the opening of the recirculation control valve. When a rapid response is required, the two-phase excitation driving scheme is put into effect, with the one/two-phase excitation driving scheme being adopted when high resolution is required.

11 Claims, 10 Drawing Sheets

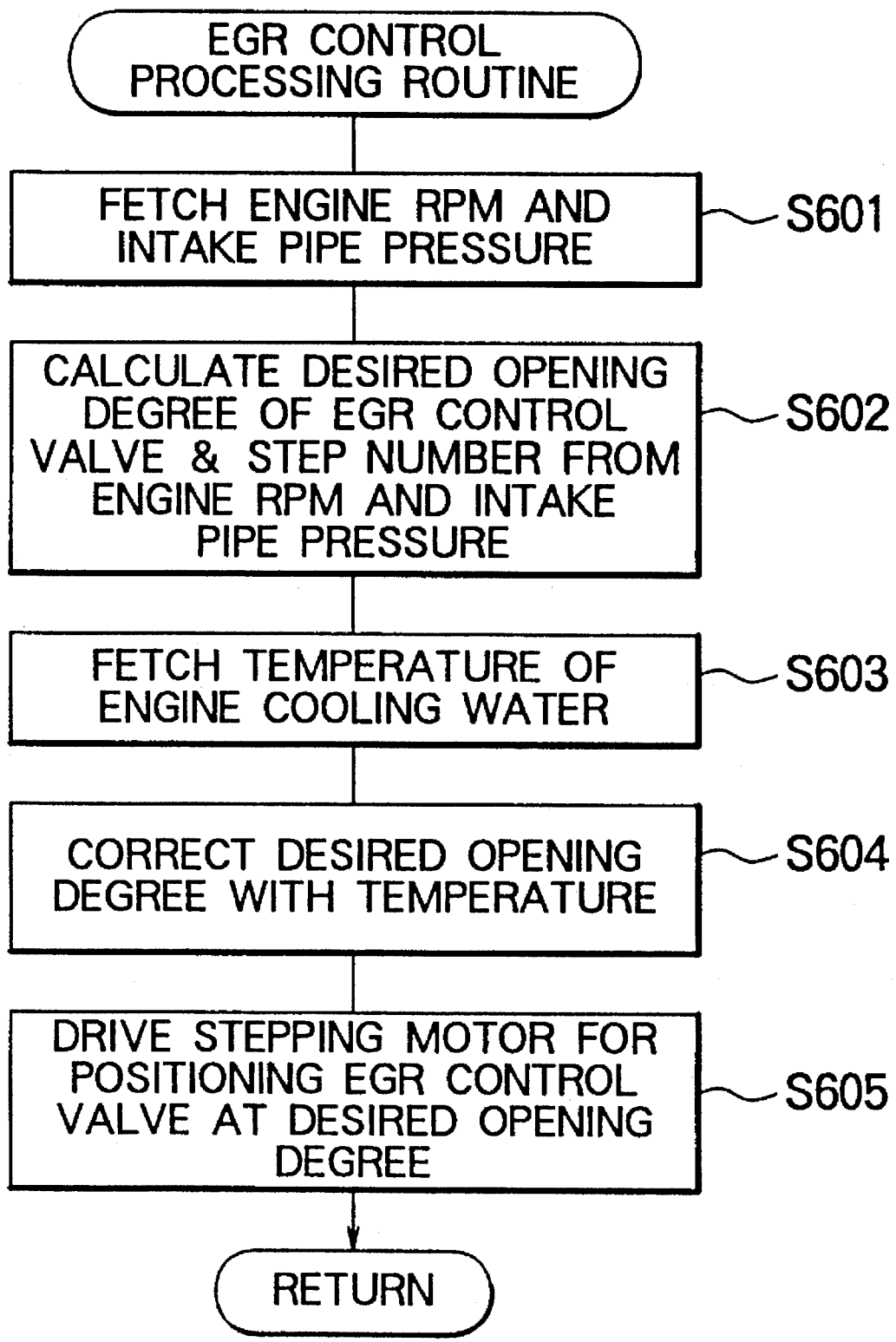

| DRIVING SCHEME | RESOLUTION STEP | DRIVING PERIOD (RESPONSE SPEED) IN MILLISECOND |
|---|---|---|
| TWO-PHASE EXCITATION SCHEME | 1 | 100 ($\tau$) |
| ONE/TWO-PHASE EXCITATION SCHEME | 1/2 | 75 ($\tau$) |

STEPPING MOTOR DRIVING APPARATUS AND EXHAUST GAS RECIRCULATION CONTROL SYSTEM USING THE SAME

BACKGROUND OF THE INVENTION

1. Field of the Invention

The present invention generally relates to a stepping motor driving apparatus for driving and controlling a stepping motor for indexing or positioning a member under control to a target or desired position. Further, the invention is concerned with an exhaust gas recirculation control system in which a stepping-motor-driven type exhaust gas recirculation valve is employed for recirculating an exhaust gas of an internal combustion engine. More particularly, the invention is concerned with an exhaust gas recirculation (EGR) control system which can ensure improved response performance as well as enhanced control accuracy in positioning an exhaust gas recirculation control valve.

2. Description of the Related Art

Heretofore, in the field of engine control systems for automobiles or motor vehicles, the exhaust gas recirculation control technique for feeding back or recirculating a part of exhaust gas to the engine for the purpose of suppressing $NO_x$-components contained in the engine exhaust gas by lowering the combustion temperature is well known. For better understanding of the invention, description will first be made of a conventional exhaust gas recirculation control system known heretofore by reference to FIG. 5.

Referring to FIG. 5, an internal combustion engine system is comprised of an engine proper 1 (hereinafter referred to as an engine) having a plurality of cylinders, an air cleaner 2 for purifying intake air to be introduced into the engine 1, an intake air pipe 3 for feeding the air introduced through the air cleaner 2 to the engine 1, an intake manifold 4 for connecting the intake pipe 3 to the plurality of cylinders of the engine 1, a fuel injector 5 for injecting fuel into the intake pipe 3, a pressure sensor 6 for detecting a pressure P within the intake pipe 3, a throttle valve 7 disposed within the intake pipe 3 for controlling an intake air flow, a throttle position sensor 8 for detecting an opening degree $\theta$ of the throttle valve 7, and a bypass air flow rate control means 9 for controlling an air flow rate which bypasses the throttle valve 7 via a pipe connected in parallel to the throttle valve 7.

An exhaust gas recirculation pipe 10 is provided for the purpose of feeding back or recirculating a part of the exhaust gas discharged from the engine 1 to the intake side thereof. An exhaust gas recirculation valve 11 of a stepping-motor-driven type is installed in the pipe 10 for controlling the flow rate of the exhaust gas recirculated therethrough. The exhaust gas recirculation control valve 11 constitutes an exhaust gas recirculation flow control means for controlling the exhaust gas recirculation flow rate in dependence on the operation states of the engine 1.

An ignition coil 13 serves for generating a high voltage required for combustion of air/fuel mixture gas within the individual cylinders of the engine 1. Provided in association with the ignition coil 13 is a firing or ignitor circuit 14 for interrupting a primary current of the ignition coil 13, to thereby generate a spark for triggering combustion of the air/fuel mixture. The exhaust gas resulting from the combustion is discharged through an exhaust pipe 15. A catalytic converter 16 is installed in the exhaust pipe 15 in a downstream region thereof.

An ignition signal Q generated by the ignition coil 13, as driven by the ignitor 14, has a frequency corresponding to the rotation speed (rpm) of the engine 1 and thus can be utilized as a sensor signal indicative of the rotation number (rpm) of the engine 1.

A water temperature sensor 17 for detecting temperature T of cooling water of the engine 1 cooperates with the throttle position sensor 8, the ignition coil 13 and others to constitute a sensor means which provides information concerning the operation states of the engine 1. An ignition key switch 21 is closed upon starting of the engine operation for supplying an electric power to various electric units of the motor vehicle from an onboard battery 20.

An electronic control unit (ECU) 22 which is put into operation upon reception of an electric power from the battery 20 includes a fuel injection amount arithmetic means and an exhaust gas recirculation flow arithmetic means which fetch from a variety of sensor means the engine operation state information such as the throttle opening degree $\theta$, the intake pipe pressure P, the ignition signal Q and others to thereby determine arithmetically or calculate the fuel injection amount and the exhaust gas recirculation flow rate, respectively, whereby a fuel injection control signal J for the fuel injector 5 and an exhaust gas recirculation control signal C for the exhaust gas recirculation control valve 11 are outputted from the electronic control unit 22.

FIG. 6 is a block diagram showing in detail a configuration of the electronic control unit 22 of FIG. 5. Referring to FIG. 6, a microcomputer 100 includes a CPU (Central Processing Unit) 200 for generating the fuel injection control signal J for the fuel injector 5 and the exhaust gas recirculation control signal C for the exhaust gas recirculation control valve 11 as determined on the basis of the aforementioned engine operation state information Q, P, $\theta$ and T in accordance with a predetermined program, a free-running counter 201 for measuring a rotation period of the engine 1, a timer 202 for measuring time spans for various controls, an analogue-to-digital converter (hereinafter referred to as the A/D converter) 203 for converting analogue input signals into digital signals, a RAM (Random Access Memory) 205 used as a work memory, a ROM (Read-Only Memory) 206 for storing various operation programs, an output port 207 for outputting the fuel injection control signal J and the exhaust gas recirculation control signal C and a common bus 208 for interconnection between the CPU 200 and the various elements 201 to 207 mentioned above.

The electronic control unit 22 further includes a first input interface circuit 101 for shaping the ignition signal Q from the ignition coil 13 to thereby generate an interrupt signal to be inputted to the microcomputer 100. Upon generation of this interrupt signal, the CPU 200 incorporated in the microcomputer 100 reads the count value from the counter 201 to thereby calculate the rotation period of the engine 1 on the basis of a difference between the count values read out at the instant time point and at a preceding time point, respectively. The engine rotation period thus determined is then stored in the RAM 205.

The electronic control unit 22 includes a second input interface circuit 102 which serves for fetching the intake pipe pressure P, the throttle opening degree $\theta$ and the cooling water temperature T from the pressure sensor 6, the throttle position sensor 8 and the water temperature sensor 17, respectively. The sensor signals mentioned above are inputted to the A/D converter 203. On the other hand, an output interface circuit 104 serves to supply the fuel injection control signal J and the exhaust gas recirculation control signal C supplied through the output port 207 to the fuel injector 5 and the exhaust gas recirculation control valve (hereinafter also referred to as the EGR control valve) 11, respectively, after amplification.

FIG. 7 is an elevational view showing a structure of the EGR control valve unit 11. Referring to the figure, a unipolar type stepping motor 30 is mounted in a valve casing of the EGR control valve 11 at a top end thereof for controlling or indexing the EGR control valve 11 between the fully closed position and the fully opened position stepwise over forty-eight steps (increments). The stepping motor 30 has an output shaft 31 with which a feed screw 32 is interlocked so as to be displaced upwardly or downwardly in correspondence to rotation of the motor shaft 31. A valve stem 33 is driven upwardly or downwardly, as viewed in the figure, by means of the feed screw 32 for regulating the flow cross-section area of the EGR control valve 11. A compression or coil-spring 34 urges constantly the valve stem 33 in the upward or valve opening direction. Disposed between the motor shaft 31 of the stepping motor 30 and the feed screw 32 is a translation mechanism 35 which serves to translate the rotation of the motor shaft 31 into the vertical (up-and-down) displacement of the motor shaft 31.

FIG. 8 is a characteristic diagram for illustrating a relation between the flow rate (liter per minute) of the EGR control valve 11 and the number of steps over which the stepping motor 30 is operated, wherein the step number of the stepping motor 30 is taken along the abscissa with the exhaust gas recirculation flow rate being taken along the ordinate. As can be seen in FIG. 8, the EGR control valve 11 assumes the fully closed state, when the step number of the stepping motor 30 is zero while assuming the fully opened state when the step number of the stepping motor 30 is "48".

It can further be seen from FIG. 8 that in the fully opened state of the EGR control valve 11 (e.g. when the exhaust gas recirculation flow rate is 500 liters per minute), a pressure difference $\Delta P$ of 200 mmHg prevails between the entrance and the exit of the EGR control valve 11. It goes without saying that the pressure difference $\Delta P$ across the EGR control valve 11 becomes higher than 200 mmHg in the fully closed state.

FIGS. 9 and 10 are flow charts for illustrating operations of the CPU 200 of the conventional exhaust gas recirculation control system, wherein FIG. 9 shows a main routine while FIG. 10 shows an exhaust gas recirculation control routine. In the following, operations of the conventional exhaust gas recirculation control system shown in FIGS. 5 to 7 will be described by reference to FIGS. 8, 9 and 10.

In a control processing step S1 of the main routine, calculation of the engine rotation number Ne (rpm) on the basis of the ignition signal Q, fetching of the aforementioned various sensor signals via the A/D converter 203, the fuel control and others processings are performed. Upon completion of the control processing step S1, an exhaust gas recirculation control processing step S2 is executed, Upon completion of execution of the step S2, the step main routine S1 is resumed. Thus, through the processing steps S1 and S2, operation of the engine 1 can be controlled.

In more detail, the exhaust gas recirculation (EGR) control processing step S2 is executed in such a manner as illustrated in FIG. 10.

First, in a step S601, the engine rotation number Ne (rpm) and the intake pipe pressure P already determined in the step S1 are fetched. Subsequently, in a step S602, a desired opening degree of the EGR control valve 11 (i.e., a desired step number of the stepping motor 30) is calculated on the basis of the engine rotation number Ne and the intake pipe pressure P as fetched.

Next, correction is made on the desired or target opening degree as determined in order to take into consideration the warmed-up state of the engine 1. To this end, the cooling water temperature T already determined in the step S1 (FIG. 9) is fetched in a step S603. In succession, in a step S604, the desired or target opening degree of the EGR control valve 11 determined in the step S602 is so corrected that it is set at a smaller value when the cooling water temperature T is low.

Finally, in a step S605, the stepping motor 30 is driven so that the desired EGR valve opening degree as determined in the step S602 and corrected in the step S604 is set.

Through the processing steps S601 to S605, the exhaust gas recirculation flow rate can be controlled to be optimal.

Next, operation of the stepping motor 30 will be described in detail by reference to FIGS. 11A and 11B together with FIGS. 12A and 12B, in which FIG. 11A is a diagram for illustrating inter-phase relation of the stepping motor 30 for driving the EGR control valve 11, FIG. 11B is a view showing interconnection of the winding coils of the stepping motor, FIGS. 12A is a view showing a driving pattern of the stepping motor 30 according to a two-phase excitation driving scheme, and FIG. 12B is a view for illustrating rotating direction of the stepping motor 30.

As is shown in FIG. 11A and 11B, windings A and B are each implemented as a bifilar winding and connected in common to a positive pole of the battery 20, wherein the coils constituting each of the windings A and B are interconnected such that upon excitation of the winding, the direction of magnetic flux in one coil is opposite to that in the other coil.

When the stepping motor 30 implemented in the structure described above is driven in accordance with a two-phase excitation driving scheme illustrated in FIGS. 12A and 12B, first and second phase stator coils (indicated by ① and ② and hatched areas in FIG. 11A) are first excited at a step position "0". Accordingly, a magnetic pole distribution shown in FIG. 11A prevails in the stator assembly. As a consequence, the S-pole of the rotor is indexed to the step position "0" which corresponds to the center of N-pole of the stator resulting from synthesization of magnetization of the first and second phase-coils ① and ②.

At a step position "1", magnetization of the winding A is changed over so that the first phase-coil ① is deenergized or deexcited while a third phase-coil ③ is excited. As a consequence, the S-pole of the rotor is angularly displaced to the step position "1" which corresponds to a center of the N-pole resulting from synthesization of the magnetizations of the second and third phase-coil ② and ③, as indicated by an arrow in FIG. 11A.

In a step position "2", the magnetization of the winding B is changed over so that the second phase-coil ② is deexcited with the fourth phase-coil ④ being excited. Thus, the S-pole of the rotor is further displaced to the step position "2". By repeating the excitation of the coils two by two with the phase shifting in this manner, a rotating magnetic field is generated, whereby the stepwise rotation of the rotor of the stepping motor is realized. Thus, the motor shaft 31 is rotated stepwise in the counterclockwise direction, as illustrated in FIG. 12B.

Of course, by changing the excitation in the pattern opposite to that mentioned above, rotation of the motor shaft 31 can be reversed (i.e., in the clockwise direction).

As is apparent from the above, by exciting the individual coils of the stepping motor 30 at a predetermined time interval $T$ (e.g. at 100 milliseconds equivalent to 100 pulses per second or PPS, see FIG. 12A) in the manner described above, the opening control (flow rate control) of the EGR control valve 11 can be carried out.

At this juncture, it should be mentioned that as the method of driving the stepping motor 30, there is known in addition to the aforementioned two-phase excitation driving scheme a one/two-phase excitation driving scheme according to which the one-phase excitation and the two-phase excitation are alternated.

Next, referring to FIG. 13, a driving pattern according to the one/two-phase excitation driving scheme will be elucidated.

According to the one/two-phase excitation type driving scheme, the stepping motor 30 is driven by repeating the excitation of the coils on a one-by-one basis (e.g. at A in FIG. 13) and the two-phase excitation (e.g. at B in FIG. 13) mentioned above. The one/two-phase excitation driving scheme is advantageous in that the angular distance for one step can be decreased by a half with the driving period $T'$ therefor being 75 milliseconds, which is shorter about a half when compared with the aforementioned two-phase excitation driving scheme.

FIG. 14 is a view showing comparison between the two-phase excitation driving scheme and the one/two-phase excitation driving scheme. At first, comparison will be made as to the resolution. According to the two-phase excitation driving scheme, the rotor and hence the motor shaft is caused to shift by one full step. On the other hand, according to the one/two-phase excitation driving scheme, the rotor rotates stepwise by a distance corresponding to a half of one step. Thus, the one/two-phase excitation driving scheme can ensure a higher resolution for the positioning or indexing of the EGR control valve 11.

On the other hand, with regards to the driving period which is an index indicating response speed of the stepping motor, the two-phase excitation driving scheme can ensure 100 milliseconds at highest, while in the case of the one/two-phase excitation driving scheme, it is 75 milliseconds. To say in another way, the time required for the rotor of the stepping motor to advance for one step is 100 milliseconds in the case of the two-phase excitation while it is 150 milliseconds in the case of the one/two-phase excitation driving scheme. Thus, the former is excellent in respect to the response speed. For this reason, the two-phase excitation driving scheme has heretofore been adopted for driving the stepping motor 30 for controlling the exhaust gas recirculation control valve 11 by putting importance on the response speed.

The conventional exhaust gas recirculation control system of the structure described above thus suffers from a problem that because the exhaust gas recirculation control valve 11 of a relatively large flow capacity is driven in accordance with the two-phase excitation driving scheme with as relatively low resolution as forty-eight steps or increments from the fully closed state to the fully opened state, magnitude of change in the exhaust gas recirculation flow rate as brought about by the change of the rotor position for one step is relatively large, which means that it is difficult or practically impossible to control the exhaust gas recirculation flow rate with higher accuracy or fineness.

An approach for coping with the problem mentioned above by increasing the number of steps of the EGR control valve driving motor which is driven in accordance with the two-phase excitation driving scheme mentioned above will encounter another problem that high cost is involved because of necessity for use of the stepping motor having high resolution (i.e., a greater number of steps). On the other hand, when the EGR control valve 11 is driven in accordance with the one/two-phase excitation driving scheme with a view to increasing the number of steps intervening between the fully closed state and the fully opened state, the resolution of control can certainly be enhanced. However, there arises a problem that the response performance is degraded because of increase in the driving frequency and corresponding delay in indexinger shifting the EGR control valve 11 from one to another position.

SUMMARY OF THE INVENTION

In the light of the state of the art described above, it is an object of the present invention to provide a stepping motor driving apparatus which allows a stepping motor to index a mechanical element to be controlled thereby to a desired position with high control accuracy at a high response speed.

Another object of the present invention is to provide an exhaust gas recirculation control system which can control the exhaust gas recirculation flow rate with high control precision or fineness while ensuring high response speed without incurring any appreciable increase in the cost for implementation of the exhaust gas recirculation control system.

In view of the above and other objects which will become more apparent as description proceeds, there is provided according to an aspect of the invention in its broadest sense an apparatus for driving a stepping motor which is arranged to index a mechanical element under control to a desired position, which apparatus comprises a driving means for driving the stepping motor in accordance with a two-phase excitation driving scheme in which coils forming a winding of the stepping motor is excited on a two-by-two basis when a high-speed response is required for indexing the mechanical element to the desired position, while driving the stepping motor in accordance with a one/two-phase excitation driving scheme in which the two-phase excitation driving scheme is alternated with a one-phase excitation driving scheme in which the coils constituting the winding are excited on a one-by-one basis when high precision is required in indexing the mechanical element to the desired position.

In a mode for carrying out the invention, the stepping motor driving apparatus may include an arithmetic means for determining a difference between a real position of the mechanical element at which it is actually positioned and the desired position, wherein the driving means drives the stepping motor in accordance with the two-phase excitation scheme when the difference is not smaller than the predetermined value thereof while driving the stepping motor in accordance with the one/two-phase excitation driving scheme when the difference is smaller than the predetermined value.

The invention finds profitable and advantageous application to the control of an exhaust gas recirculation control valve of an internal combustion engine of a type in which a part or proportion of exhaust gas is recirculated into the engine.

Thus, there is provided according to another aspect of the present invention an exhaust gas recirculation control system for controlling recirculation of the exhaust gas, which system comprises an exhaust gas recirculation pipe connected between an intake pipe and an exhaust pipe of the engine for recirculating a part of exhaust gas from the exhaust pipe into the intake pipe, an exhaust gas recirculation control valve installed in the exhaust gas recirculation pipe for controlling a flow rate of the exhaust gas flowing through the exhaust gas recirculation pipe, a stepping motor for driving the exhaust gas recirculation valve, a sensor means for detecting operation state of the internal combustion engine to thereby generate output signals indicative of the engine operation state, an exhaust gas recirculation flow rate arithmetic means for arithmetically determining an exhaust gas recirculation flow rate on the basis of the engine operation state information derived from the outputs of the sensor means, an exhaust gas recirculation flow rate control means for controlling flow rate of the exhaust gas recirculated into the internal combustion engine so that the flow rate conforms to the engine operation state, and a driving means for driving the stepping motor for thereby controlling a flow cross-section area of the exhaust gas recirculation valve in accordance with a driving scheme in which a combination of a two-phase excitation driving scheme according to which coils forming a winding assembly of the stepping motor is excited on a two-by-two basis and a one/two-phase excitation driving scheme according to which the two-phase excitation driving scheme is alternated with a one-phase excitation driving scheme in which the coils are excited on a one-by-one basis is adopted, wherein the exhaust gas recirculation flow rate control means controls the exhaust gas recirculation flow rate so that the exhaust gas recirculation flow rate conforms to the engine operation state by changing the flow passage cross-section area of the exhaust gas recirculation valve by the driving means by effectuating appropriately and selectively the two-phase excitation driving scheme and the one/two-phase excitation driving scheme.

In the arrangement of the exhaust gas recirculation control system mentioned above, the two-phase excitation driving scheme is validated when quick response is required for the exhaust gas recirculation control while the one/two-phase excitation driving scheme is effectuated when high resolution is required for the positioning or indexing of the EGR control valve.

In a preferred mode for carrying out the invention, the driving means may include an arithmetic means for calculating a difference between an actual opening degree of the exhaust gas recirculation control valve and a desired opening degree thereof which conforms to the engine operation state for changing over the two-phase excitation driving scheme and the one/two-phase excitation driving scheme, wherein the two-phase excitation driving scheme is adopted when the difference is not smaller than a predetermined value while the one/two-phase excitation driving scheme is adopted when the difference is smaller than the predetermined value.

According to yet another aspect of the invention, there is provided an exhaust gas recirculation control system for controlling recirculation of the exhaust gas, which system comprises an exhaust gas recirculation pipe connected between an intake pipe and an exhaust pipe of the engine for recirculating a part of exhaust gas from the exhaust pipe into the intake pipe, an exhaust gas recirculation control valve installed in the exhaust gas recirculation pipe for controlling a flow rate of the exhaust gas flowing through the exhaust gas recirculation pipe, a stepping motor for driving the exhaust gas recirculation valve, a sensor means for detecting operation state of the internal combustion engine to thereby generate output signals indicative of engine operation state, an exhaust gas recirculation flow rate arithmetic means for arithmetically determining an exhaust gas recirculation flow rate on the basis of the engine operation state information derived from the outputs of the sensor means, and an exhaust gas recirculation flow rate control means for controlling flow rate of the exhaust gas recirculated into the internal combustion engine so that the flow rate conforms to the engine operation state, wherein the exhaust gas recirculation valve controls the flow rate of the exhaust gas flowing through the exhaust gas recirculation pipe in accordance with two discrete flow-rate characteristics such that in a range close to the fully closed state of the exhaust gas recirculation control valve where the step number of the stepping motor becomes small, change in the flow rate of the exhaust gas is small.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

FIG. 10 is a flow chart illustrating an exhaust gas recirculation control known heretofore;

DESCRIPTION OF THE PREFERRED EMBODIMENTS

In the following, the present invention will be described in detail in conjunction with preferred or exemplary embodiments thereof by reference to the drawings.

Embodiment 1

Figure 1:
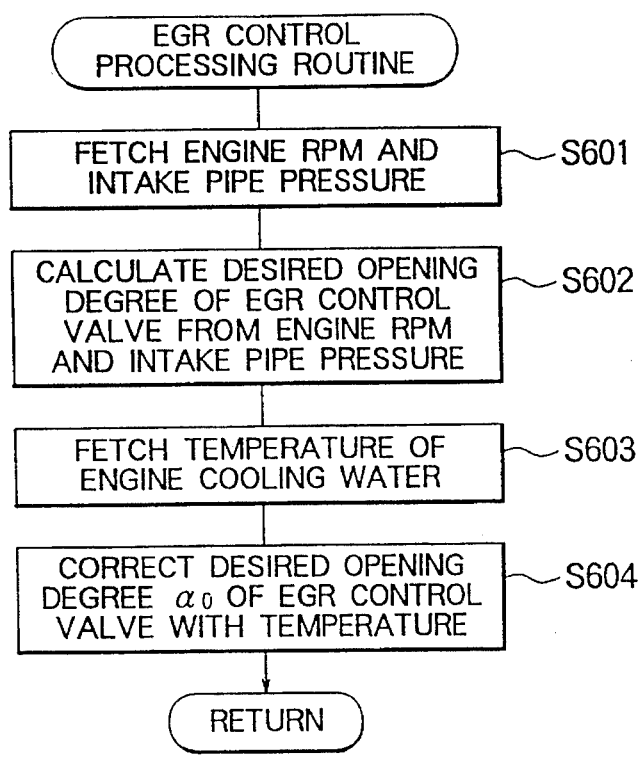
FIG. 1 is a flow chart illustrating a main routine of an exhaust gas recirculation control processing according to a first embodiment of the invention.
Figure 2:
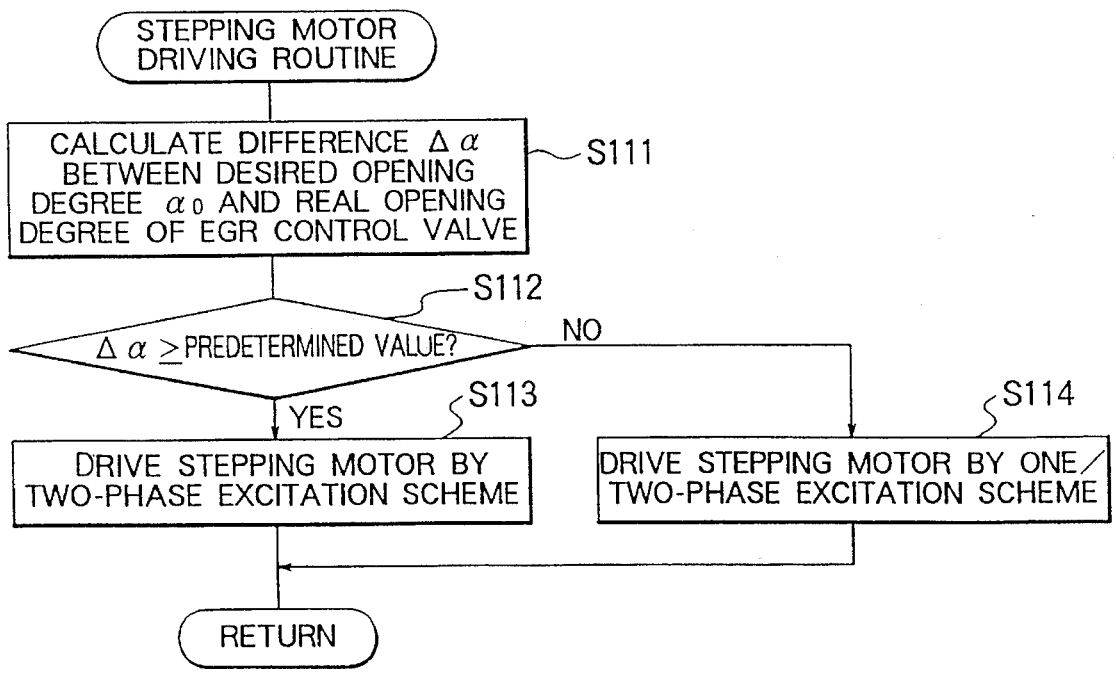
FIG. 2 is a flow chart illustrating a processing routine for driving a stepping motor according to the first embodiment of the invention.

A first embodiment of the invention will be described. In the beginning, it must first be pointed out that the general arrangement of the system which the instant embodiment of the invention concerns is substantially the same as that shown in FIG. 5 except for the functions of the exhaust gas recirculation flow rate control means incorporated in the electronic control unit 22 and the driving means inclusive of the exhaust gas recirculation valve 11. Accordingly, description which follows is based on the arrangement shown in FIG. 5, 6 and 7, FIGS. 1 and 2 are flow charts illustrating the exhaust gas recirculation control operation according to the first embodiment of the invention, wherein FIG. 1 shows a main routine of the exhaust gas recirculation control processing, and FIG. 2 shows a routine for driving the stepping motor 30. In FIG. 1, steps S601 to S604 are substantially the same as those designated by same reference symbols in FIG. 10. Accordingly, repetitive description of these steps will be unnecessary.

Figure 5:
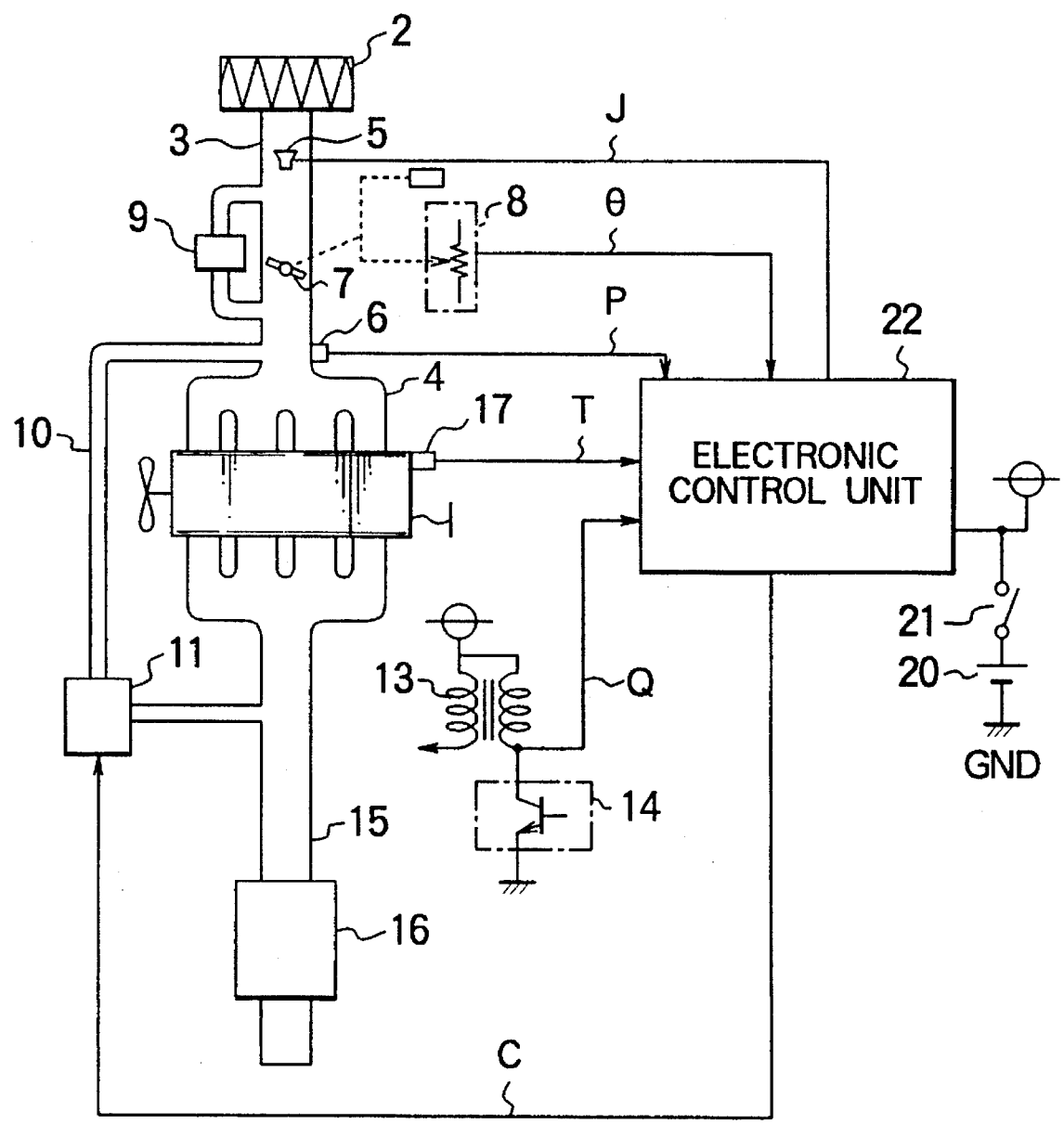
FIG. 5 is a diagram showing schematically a general arrangement of an exhaust gas recirculation control system of stepping motor driven type to which the invention can profitably be applied.
Figure 6:
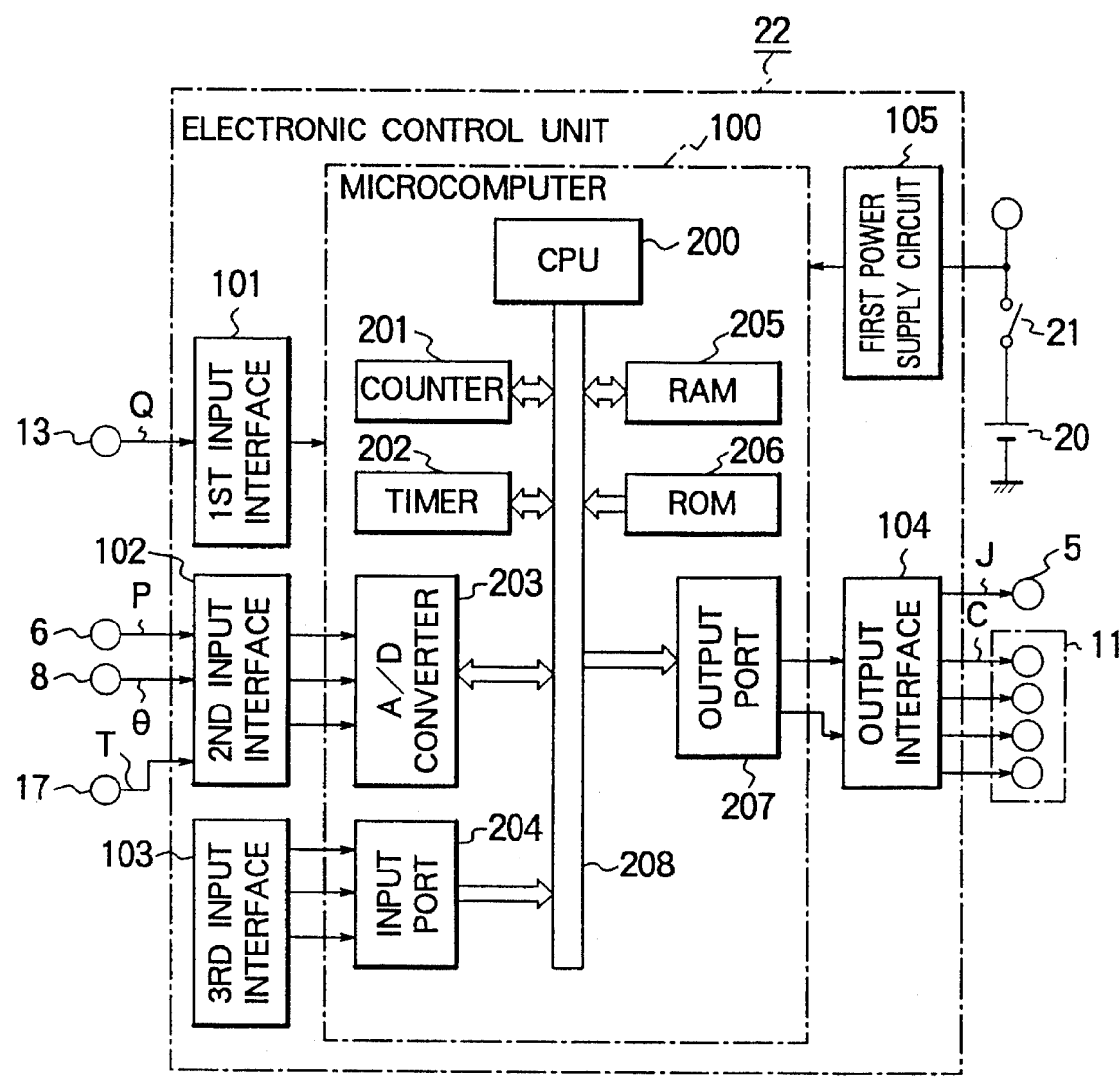
FIG. 6 is a block diagram showing a configuration of an electronic control unit shown in FIG. 5.
Figure 7:
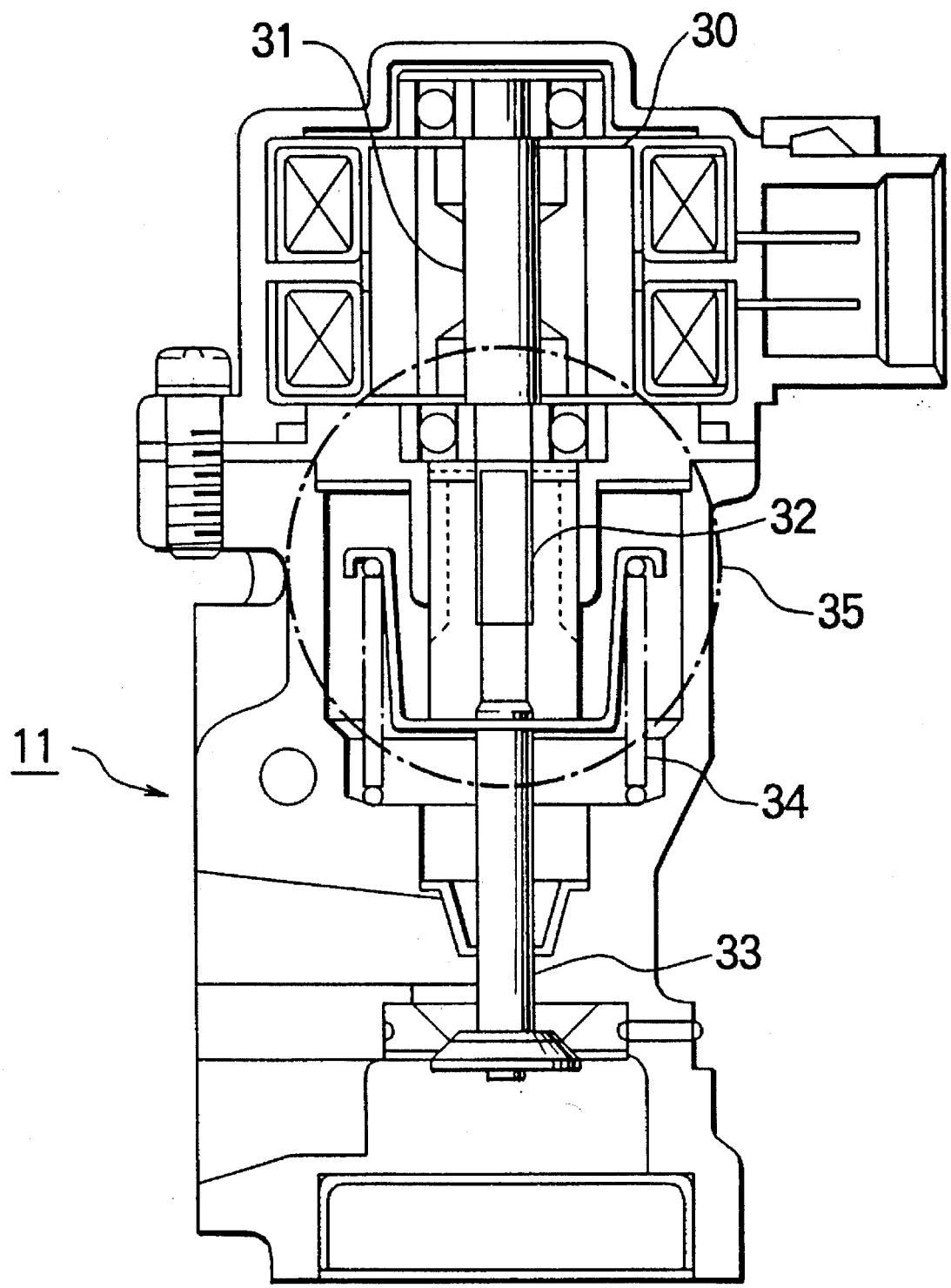
FIG. 7 is an elevational view showing a structure of a stepping motor driven exhaust gas recirculation control valve.
Figure 8:
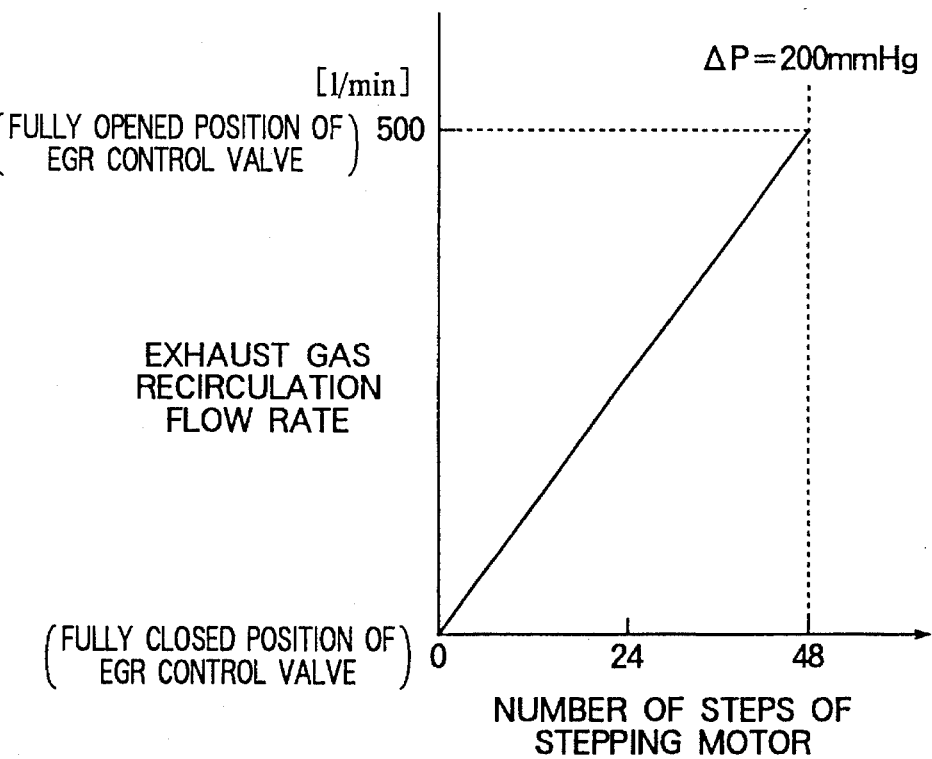
FIG. 8 is a characteristic diagram for illustrating a relation between flow rate of an exhaust gas recirculation control valve and the number of steps over which a stepping motor is operated.
Figure 9:
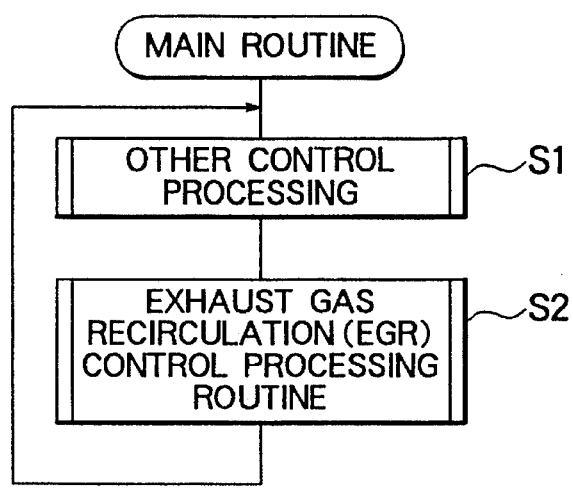
FIG. 9 is a flow chart illustrating in general a main routine processing executed by the electronic control unit of the exhaust gas recirculation control system.
Figure 11A:
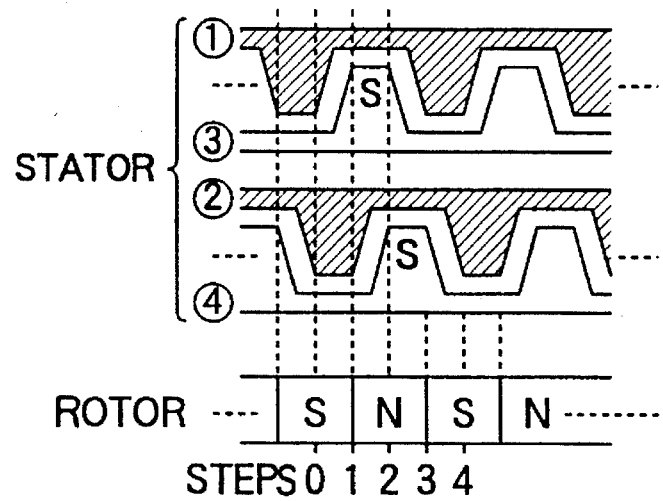
FIG. 11A is a diagram for illustrating inter-phase relation of a stepping motor for driving the exhaust gas recirculation control valve.
Figure 11B:
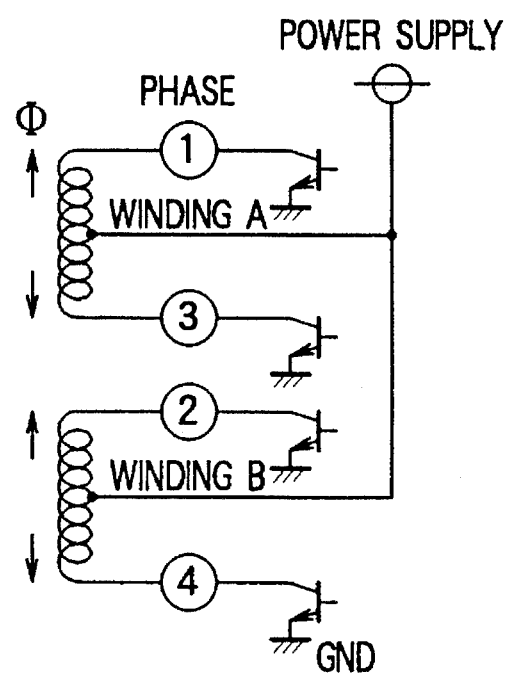
FIG. 11B is a view showing interconnection of coils constituting windings of the stepping motor.
Figure 12A:
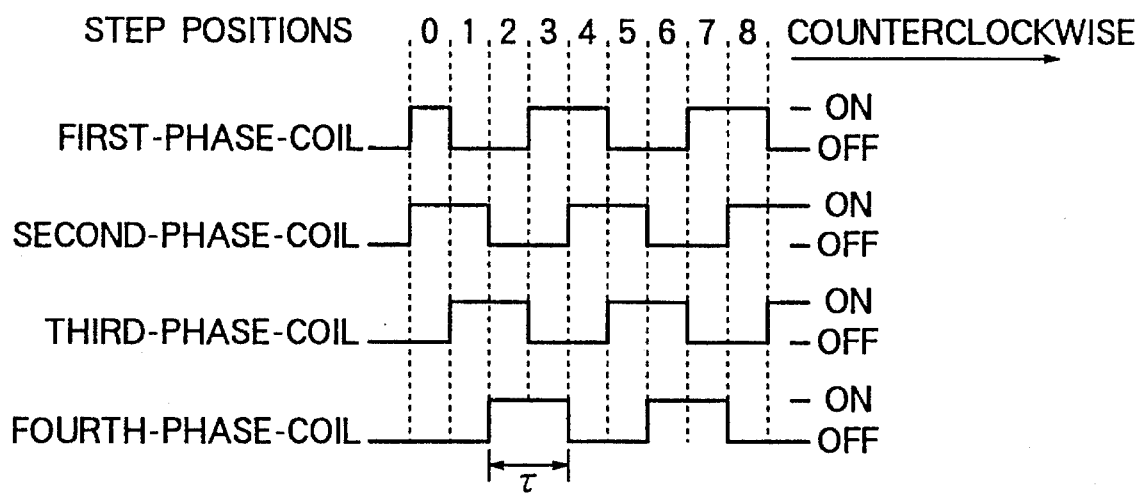
FIGS. 12A is a view showing a driving pattern of the stepping motor according to a two-phase excitation driving scheme.
Figure 12B:
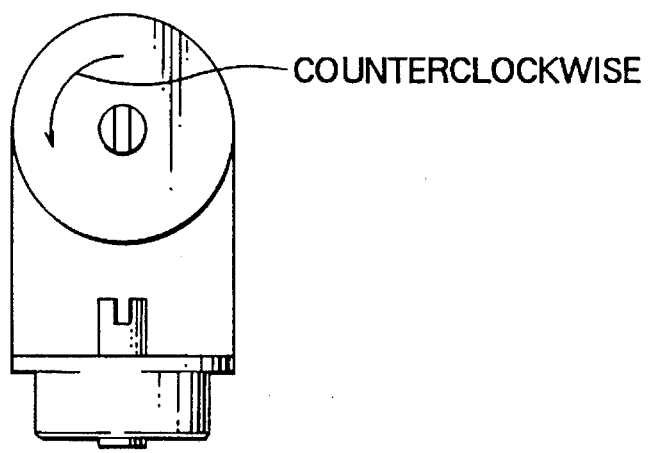
FIG. 12B is a view illustrating rotating direction of the stepping motor.
Figures 13, 14:
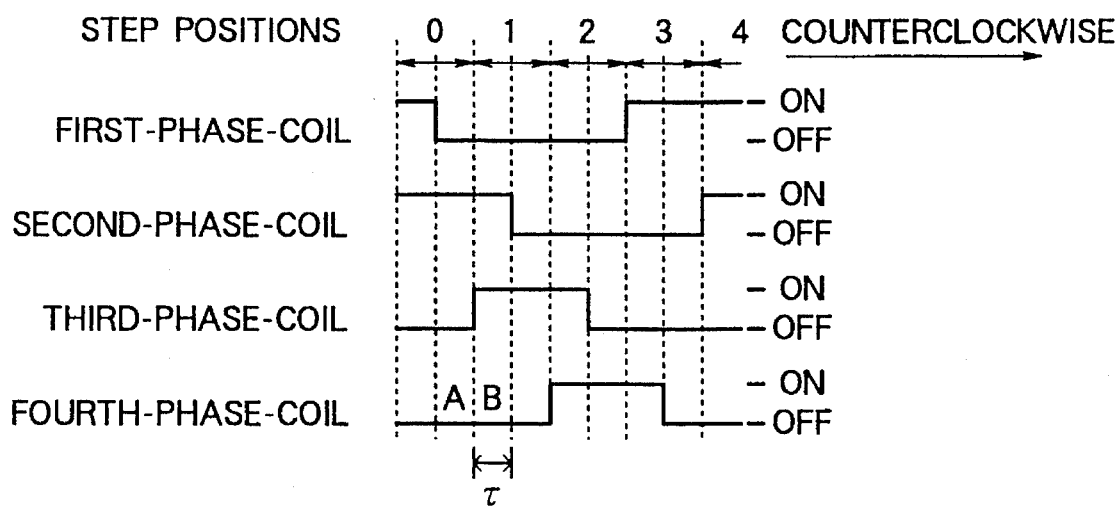
FIG. 13 is a diagram illustrating a driving pattern according to a one/two-phase excitation driving scheme for a stepping motor.
FIG. 14 is a diagram for illustrating comparatively features of the two-phase excitation driving scheme and the one/two-phase excitation driving scheme.

Now, operation of the instant embodiment of the invention will be elucidated by referring to FIGS. 1 and 2 together with FIGS. 5 to 7.

At first, in the steps S601 to S604 of the main routine, the desired number of steps is arithmetically determined through the similar procedure described hereinbefore to thereby calculate a desired opening degree $\alpha_0$ of the exhaust gas recirculation (EGR) control valve 11.

Subsequently, the stepping motor driving routine shown in FIG. 2 is executed. Referring to the figure, in a step S111, a difference or deviation $\Delta\alpha$ of an actual or real opening degree $\underline{\alpha}$ from the desired opening degree $\alpha_0$ is determined in accordance with $\Delta\alpha=\alpha-\alpha_0$.

In a step S112, it is decided whether or not the difference $\Delta\alpha$ is greater than a predetermined value inclusive thereof. If so (i.e., when the decision step S112 results in affirmation "YES"), this means that the difference between the real opening degree $\underline{\alpha}$ and the desired opening degree $\alpha_0$ of the EGR control valve 11 is great and thus the stepping motor should preferably be operated with a rapid response. Accordingly, the processing proceeds to a step S 113, wherein the stepping motor 30 is driven in accordance with the two-phase excitation driving scheme which can ensure a high-speed response, as mentioned hereinbefore. Parenthetically, the predetermined value for the difference $\Delta\alpha$ may differ in dependence on the type of the exhaust gas recirculation control valve 11 and the flow rate and can not be defined definitely. However, since there exists correlation between the real opening degree $\underline{\alpha}$ of the EGR control valve and the exhaust gas recirculation flow rate, the predetermined value mentioned above may be so selected as to be equivalent to an exhaust gas recirculation flow rate for which deviation of the exhaust gas recirculation ratio $P_{EGR}$ defined by the expression (1) mentioned below is greater than 2% and usually lies within a range of 5% to 10%:

$$P_{EGR} \approx Q_e/Q_a \times 100 \text{ (in percentage)} \tag{1}$$

where $Q_e$ represents the exhaust gas recirculation flow rate and $Q_a$ represents the intake air flow rate in the engine.

On the other hand, when the difference $\Delta\alpha$ is decided smaller than the predetermined value in the step S112 (i.e., answer of this decision steps is negative "NO"), this means that the difference $\Delta\alpha$ between the real opening degree $\underline{\alpha}$ and the desired opening degree $\alpha_0$ of the exhaust gas recirculation control valve 11 is small. In that case, the stepping motor should be driven with preference being put on the control precision or resolution. Accordingly, the processing proceeds to a step S114 where the stepping motor 30 is driven in accordance with the one/two-phase excitation driving scheme mentioned hereinbefore.

By virtue of the processings mentioned above, the one/two-phase excitation driving scheme can be validated to realize a high resolution of control when a high control accuracy is demanded, while the two-phase excitation driving scheme can be effectuated when a high-speed control response is demanded. In the latter case, the exhaust gas recirculation control can be effected with a response comparable to that of the conventional exhaust gas recirculation control system.

Embodiment 2

In the case of the first embodiment of the invention, the stepping motor driving scheme is changed over in dependence on whether or not the difference $\Delta\alpha$ between the real opening degree $\underline{\alpha}$ and the desired opening degree $\alpha_0$ of the EGR control valve 11 is greater than a predetermined value, wherein the one/two-phase excitation driving scheme is put into effect when the difference $\Delta\alpha$ is smaller than the predetermined value, independent of whether the desired number of steps is an integer or not. In this conjunction, it should be mentioned that when the desired step number is represented by an integer, the control precision can be put aside from consideration. Accordingly, the one/two-phase excitation driving scheme may rather incur degradation in the control response behavior.

Under the circumstances, it is desirable to change over the stepping motor driving scheme in dependence on whether the desired number of steps is an integer or not, wherein only the two-phase excitation driving scheme is adopted when the desired step number is given by an integer and, if otherwise, the two-phase excitation driving scheme ensuring a high-speed response is adopted for driving the stepping motor over an angular distance given by an integral number of steps, while the one/two-phase excitation driving scheme is adopted for rotating the stepping motor over an angle corresponding to a remaining half step.

Figure 3:
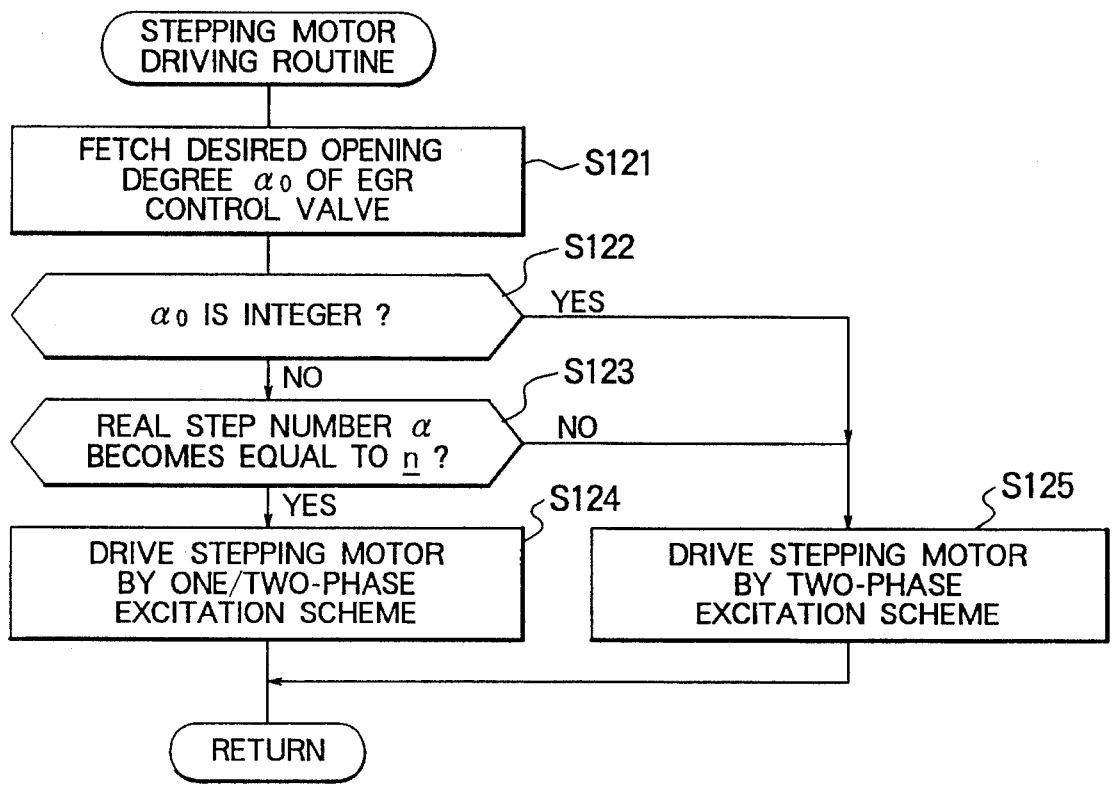
FIG. 3 is a flow chart showing a motor driving routine according to a second embodiment of the invention.

FIG. 3 is a flow chart showing a motor driving routine according to a second embodiment of the invention in which the control response performance is further improved without degrading the control accuracy. This routine is executed periodically at an interval of, for example, 100 milliseconds. Now, operation of the instant embodiment will be described by referring to FIG. 3.

In a step S121, the desired opening degree $\alpha_0$ of the exhaust gas recirculation valve as determined through the main routine shown in FIG. 1 is read out, which is then followed by a step S122 where decision is made as to whether the step number corresponding to the desired opening degree $\alpha_0$ is given by an integer or not.

When the step number corresponding to the desired opening degree $\alpha_0$ is an integer (i.e., when the decision step S122 results in affirmation "YES"), this means that the control precision is not of concern. Accordingly, the stepping motor may be driven in accordance with the two-phase excitation driving scheme. Thus, the processing proceeds to a step S125 where the stepping motor 30 is driven in accordance with two-phase excitation driving scheme.

On the other hand, when the answer of the decision made in the step S122 is negative (NO), this means that the desired opening degree $\alpha_0$ is given by n+½ (where n represents an integer). Thus, it is required to drive the stepping motor 30 in accordance with the one/two-phase excitation driving scheme in order to ensure a desired control accuracy.

Under the circumstances, the processing proceeds to a step S123 where it is decided whether or not the number of steps corresponding to the real opening degree $\alpha$ of the exhaust gas recirculation valve (this step number will be referred to as the real step number) is equal to n (where n is an integer).

Unless the real step number (the real opening degree $\alpha$ of the EGR control valve) coincides with n, the processing proceeds to a step S125 where the stepping motor 30 is driven in accordance with the two-phase excitation driving scheme control until the real opening degree $\alpha$ becomes equal to n. In this manner, the stepping motor 30 is driven in accordance with the two-phase excitation driving scheme with a high-speed response over the step number corresponding to the integer n.

On the other hand, in case the real opening degree $\alpha$ of the stepping motor 30 coincides with n steps, the stepping motor is to be driven in accordance with the one/two-phase excitation driving scheme for the last half step. Accordingly, the processing proceeds to a step S124 where the stepping motor 30 is driven in accordance with the one/two-phase excitation driving scheme.

In this manner, the control response can be enhanced over that of the first embodiment without degrading the control precision because the stepping motor is driven in accordance with the one/two-phase excitation driving scheme one for the last half step.

Embodiment 3

In the case of the stepping motor controls according to the first end second embodiments of the invention, the stepping motor driving schemes are changed over in order to improve both the control resolution and the response compatibly. However, the flow rate characteristic of the EGR control valve 11 may be such that it can be represented by a two-segment polygonal-line curve.

Figure 4:
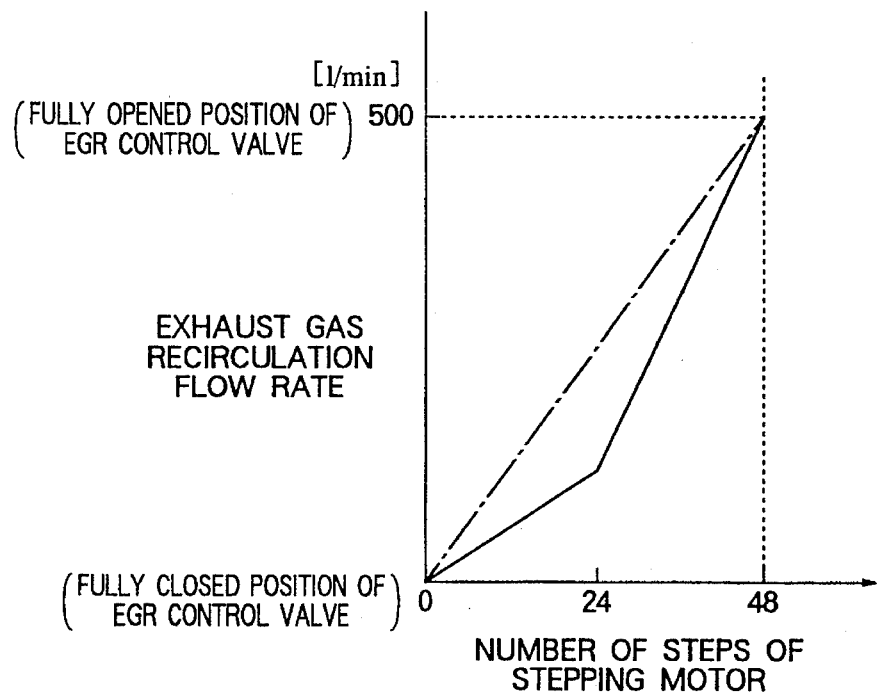
FIG. 4 is a characteristic diagram for illustrating graphically an exhaust gas recirculation flow rate characteristic of an exhaust gas recirculation control valve according to a third embodiment of the invention.

FIG. 4 is a characteristic diagram for illustrating graphically an exhaust gas recirculation flow rate characteristic which is represented by a two-segment polygonal-line curve and which is adopted in the control to be performed according to a third embodiment of the invention. In the figure, the step number of the stepping motor 30 is taken along the abscissa with the exhaust gas recirculation flow rate being taken along the ordinate.

In general, the exhaust gas recirculation flow rate control of high accuracy is required in the region close to the fully closed state of the control valve 11. Accordingly, in the region where the step number of the stepping motor 30 is small, a flow rate control characteristic according to which the flow rate is varied only a little is employed.

By adopting the exhaust gas recirculation flow rate characteristic represented by the two-segment polygonal-line curve (see a solid line curve shown in FIG. 4), the change in the exhaust gas recirculation flow per one step of the stepping motor becomes small in the region where the step number of the stepping motor 30 is small, i.e., in the vicinity of the fully closed state of the EGR control valve 11 where the exhaust gas recirculation flow rate is low, whereby the resolution for the exhaust gas recirculation flow rate control can be enhanced.

Embodiment 4

In the case of the third embodiment of the invention, the control response behavior equivalent to that attained with the conventional control technique can be realized by adopting the two-phase excitation driving scheme. It goes however without saying that the control accuracy (i.e., resolution) as well as the response characteristic can further be improved by making use of the two-segment polygonal-line flow characteristic and adopting a combination of the two-phase excitation driving scheme and the one/two-phase excitation driving scheme described previously in conjunction with the first and second embodiments.

As is apparent from the foregoing, there has been provided according to the embodiments of the invention an exhaust gas recirculation control system which can ensure high control accuracy (high resolution) as well as rapid response in the exhaust gas recirculation flow rate control without incurring any appreciable increase in the manufacturing cost by virtue of the driving means for driving the stepping motor to control the flow cross-sectional area of the EGR control valve exchangeably in accordance with the two-phase excitation driving scheme and the one/two-phase excitation driving scheme, wherein the two-phase excitation driving scheme is adopted in the case where high-speed response of the control is demanded while the one/two-phase excitation driving scheme is adopted when the control of high resolution is required, whereby the exhaust gas recirculation flow rate can be controlled accurately so that the exhaust gas recirculation conforming to the engine operation state can be realized.

Further, for changing over the two-phase excitation driving scheme and the one/two-phase excitation driving scheme, a difference between the real opening degree of the EGR control valve and the desired opening degree is determined, wherein when the difference is greater than a predetermined value inclusive thereof, the two-phase excitation driving scheme is put into effect whereas when the difference is smaller than the predetermined value, the one/two-phase excitation driving scheme is adopted. Owing to this feature, the response of the exhaust gas recirculation flow rate control can be enhanced when the difference mentioned above is greater than the predetermined value inclusive. If otherwise, the control accuracy can be improved.

Additionally, owing to the control of the exhaust gas recirculation flow rate in accordance with the two-segment polygonal-line characteristic curve, the flow rate can be controlled such that change of the flow rate becomes small in the region where the step number of the stepping motor is small (i.e., in the region close to the fully closed position of the EGR control valve), the exhaust gas recirculation flow rate can be controlled with high accuracy even in the region where the opening degree of the EGR control valve is small without involving degradation in the response characteristic in the region of intermediate and large opening degrees of the EGR control valve.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the exhaust gas recirculation control for the internal combustion engine, it should be appreciated that the teachings of the invention can find other applications where control of the stepping motor is required so as to enhance the positioning accuracy and the response speed. Accordingly, the invention should never be interpreted in any limiting sense.

Thus, all suitable modifications and equivalents may be resorted to, falling within the spirit and scope of the invention.

What is claimed is:

1. In an internal combustion engine of a type in which a part of exhaust gas discharged therefrom is recirculated to said engine,
    an exhaust gas recirculation control system for controlling recirculation of said exhaust gas, comprising:
        an exhaust gas recirculation pipe connected between an intake pipe and an exhaust pipe of said engine for recirculating a part of exhaust gas from said exhaust pipe into said intake pipe;
        an exhaust gas recirculation control valve installed in said exhaust gas recirculation pipe for controlling a flow rate of the exhaust gas flowing through said exhaust gas recirculation pipe, said exhaust gas recirculation valve being driven by a stepping motor;
        sensor means for detecting an operation state of said internal combustion engine to thereby generate output signals indicative of engine operation state information;
        exhaust gas recirculation flow rate arithmetic means for arithmetically determining an exhaust gas recirculation flow rate on the basis of said engine operation state information derived from the outputs of said sensor means; and
        exhaust gas recirculation flow rate control means for controlling the flow rate of the exhaust gas recirculated into said internal combustion engine so that said flow rate conforms to said engine operation state;
    wherein said exhaust gas recirculation valve controls the flow rate of said exhaust gas flowing through said exhaust gas recirculation pipe in accordance with a plural segment polygonal line having at least two discrete flow-rate characteristics such that in a range close to a fully closed position of said exhaust gas recirculation control valve where the number of steps of said stepping motor is small, a change in said flow rate of the exhaust gas becomes small.

2. An exhaust gas recirculation control system according to claim 1,
    wherein said two discrete flow-rate characteristics and a combination of a two-phase excitation mode and a one/two-phase excitation mode are adopted.

3. In an internal combustion engine of a type in which a part of exhaust gas discharged therefrom is recirculated to said engine,
    an exhaust gas recirculation control system for controlling recirculation of said exhaust gas, comprising:
        an exhaust gas recirculation pipe connected between an intake pipe and an exhaust pipe of said engine for recirculating a part of exhaust gas from said exhaust pipe into said intake pipe;
        an exhaust gas recirculation control valve installed in said exhaust gas recirculation pipe for controlling a flow rate of the exhaust gas flowing through said exhaust gas recirculation pipe, said exhaust gas recirculation valve being driven by a stepping motor;
        sensor means for detecting an operation state of said internal combustion engine to thereby generate output signals indicative of engine operation state information;
        exhaust gas recirculation flow rate arithmetic means for arithmetically determining an exhaust gas recirculation flow rate on the basis of said engine operation state information derived from the outputs of said sensor means;
        exhaust gas recirculation flow rate control means for controlling flow rate of the exhaust gas recirculated to said internal combustion engine so that said flow rate conforms to said engine operation state; and
        driving means for driving said stepping motor to thereby control a flow passage cross-section area of said exhaust gas recirculation valve in accordance with a driving scheme in which a combination of a two-phase excitation mode in which coils forming a winding assembly of said stepping motor are excited on a two-by-two basis, and a one/two-phase excitation mode in which said two-phase excitation mode is alternated with a one-phase excitation mode in which said coils are excited on a one-by-one basis is adopted;
    wherein said exhaust gas recirculation flow rate control means controls said exhaust gas recirculation flow rate so that said exhaust gas recirculation flow rate conforms to said engine operation state by changing the flow cross-section of said exhaust gas recirculation control valve by said driving means by effectuating selectively said two-phase excitation mode when high-speed response is a dominant criterion, and said one/two-phase excitation mode when high accuracy is a dominant criterion.

4. An exhaust gas recirculation control system according to claim 3,
    wherein said driving means includes arithmetic means for calculating a difference between an actual opening degree of said exhaust gas recirculation valve and a desired opening degree of said exhaust gas recirculation valve conforming to said engine operation state in order to change over said two-phase excitation mode and said one/two-phase excitation mode, and
    wherein said two-phase excitation mode is adopted when said difference is not smaller than a predetermined value, and said one/two-phase excitation mode is adopted when said difference is smaller than said predetermined value.

5. An exhaust gas recirculation control system according to claim 4,
    wherein said predetermined value is so selected as to be equivalent to an exhaust gas recirculation flow rate for which deviation of exhaust gas recirculation ratio ($P_{EGR}$) defined by the following expression is greater than 2%:

$$P_{EGR} = Q_e/Q_a \times 100 \text{ (in percentage)} \qquad (1)$$

where $Q_e$ represents the exhaust gas recirculation flow rate, and $Q_a$ represents an intake air flow rate in the engine.

6. An exhaust gas recirculation control system according to claim 3, wherein said driving means drives said stepping motor in said two-phase excitation mode when a desired position of the exhaust gas recirculation control valve is an integer or when a number of steps to the desired position is not an integer, and in said one/two phase excitation mode when both the desired position is not an integer and the number of steps is an integer.

7. An apparatus for driving a stepping motor which is arranged to index a mechanical element under control to a desired position, comprising:

driving means for driving said stepping motor in a two-phase excitation mode in which coils forming a winding assembly of said stepping motor are excited on a two-by-two basis when high-speed response is a dominant criterion for indexing said mechanical element to said desired position, and for driving said stepping motor in a one/two-phase excitation mode in which said two-phase excitation mode is alternated with a one-phase excitation mode in which said coils are excited on a one-by-one basis, when high accuracy is a dominant criterion for indexing said mechanical element to said desired position.

8. A stepping motor driving apparatus according to claim 7, wherein said mechanical element under control is a valve element of an exhaust gas recirculation control valve of an internal combustion engine for recirculating a part of exhaust gas of said engine.

9. A stepping motor driving apparatus according to claim 7, wherein said driving means drives said stepping motor in said two-phase excitation mode when a desired position of the mechanical element is an integer or when a number of steps to the desired position is not an integer, and in said one/two phase excitation mode when both the desired position is not an integer and the number of steps is an integer.

10. A stepping motor driving apparatus according to claim 7, further comprising:

arithmetic means for determining a difference between a real position of said mechanical element at which said mechanical element is actually positioned, and said desired position;

wherein said driving means drives said stepping motor in said two-phase excitation mode when said difference is greater than a predetermined value inclusive thereof, and in said one/two-phase excitation mode when said difference is smaller than said predetermined value.

11. A stepping motor driving apparatus according to claim 10, wherein said mechanical element under control is a valve element of an exhaust gas recirculation control valve of an internal combustion engine for recirculating a part of exhaust gas of said engine.

* * * * *